United States Patent [19]

Miller

[11] 4,221,412
[45] Sep. 9, 1980

[54] EXTENDABLE VEHICLE LATERAL SIDE GUARD

[76] Inventor: Diane Miller, 2241 NE. 34th Ct., Lighthouse Point, Fla. 33064

[21] Appl. No.: 958,262

[22] Filed: Nov. 6, 1978

[51] Int. Cl.² ............................................. B60R 27/00
[52] U.S. Cl. .................................. 293/118; 293/128; 280/770
[58] Field of Search .............. 293/118, 119, 126, 128, 293/1; 280/770

[56] References Cited

U.S. PATENT DOCUMENTS

| | | | |
|---|---|---|---|
| 1,505,662 | 8/1924 | O'Conner | 293/119 |
| 3,131,960 | 5/1964 | Popp | 280/770 |
| 3,243,222 | 3/1966 | Loughary | 293/1 |
| 4,066,285 | 1/1978 | Hall | 293/1 |

*Primary Examiner*—Robert R. Song
*Attorney, Agent, or Firm*—Barry L. Haley; Eugene F. Malin; Philip R. Wadsworth

[57] ABSTRACT

A guard strip disposed on each lateral side of a vehicle for protecting doors, fenders, or the like which is moveably extendable from a first position, in which the strip has the aesthetic appearance of a conventional, decorative (usually chrome) strip found on a vehicle, to a second position away from the lateral surface of the vehicle extending outwardly to establish a spaced guard strip whenever the vehicle is parked.

1 Claim, 6 Drawing Figures

EXTENDABLE VEHICLE LATERAL SIDE GUARD

BACKGROUND OF THE INVENTION

This invention relates generally to a vehicle surface guard which is useful to protect the lateral surfaces such as doors, fenders, and the like from becoming scratched, dented, and nicked (usually caused from the driver or passenger of another vehicle opening the door of the other vehicle against the vehicle to be protected).

Various types of vehicle body or door guard strips have been suggested in the prior art. Some of these strips include large, thick, plastic, rubber, or metal types of guard strips which, although in some respects protective, are aesthetically unpleasing and drag inducing. Other types of strips with a low drag profile which are aesthetically pleasing fail to sufficiently protect the vehicle surface because the size, shape and disposition are too small for them to be effective.

The present invention ovecomes the problems of the prior art by providing for rigid, protective strips which are horizontally disposed along the lateral sides of a vehicle which in the retracted position have the aesthetic appearance of conventional, side protective strips but which may be moveably extended, outwardly, away from the lateral sides of the vehicle a sufficient distance to insure that the vehicle's lateral side surfaces will be adequately protected against contact with another vehicle. The invention provides for manually or automatically moving each strip reciprocally between retracted and extended positions using pneumatic, electrical, hydraulic, or manual power.

BRIEF DESCRIPTION OF THE INVENTION

A guard strip for a vehicle which is disposed on each lateral side of a vehicle along the doors, fenders, or the like which include a barrier strip, a pair of mounting arms connected through apertures in the vehicle surface to one side of said strip, a support frame mounted on the inner side of the vehicle surface to be protected and a power source coupled to a linkage arm connected to the frame that is movable from a first position to a second position.

The barrier strip is mounted and affixed to the vehicle through a pair of apertures in the vehicle's lateral side on arcuate parallel arms connected to the back side of the strip. If mounted on a vehicle door, a U-shaped support frame is housed within the door. The frame pivots at its base to extend or retract the barrier strip. Also the supporting linkage and power source connected to the frame is mounted within the door of the vehicle. The barrier strip (which appears to be a conventional protective strip in the retractive position), is supported by arms of sufficient length projecting inwardly to the frame to allow adequate outward lateral extension of the barrier strip from the vehicle surface a distance substantially equal to the lateral thickness of the door frame.

In one embodiment, the power source may be a vacuum/pneumatic system which includes a pneumatically moveable piston and linkage arm connected to the support frame to move and hold the strip from a first retracted position to a second extended position. A spring returns the strip to the retracted position upon removal of the pneumatic or vacuum force on the piston.

In operation, the device is normally utilized when the vehicle is parked. The operator of the vehicle, upon exiting the vehicle actuates a switch to the pneumatic/vacuum system which extends the guard strips from the retracted position outwardly away from the lateral sides of the vehicle to the extended position. In this position, the guard strips are extended sufficiently away from the surface of the vehicle to provide complete protection of the vehicle's lateral surfaces from scratches, nicks, or dents by preventing contact of the lateral surface with another vehicle, since each guard strip in its extended position would contact the other vehicle first. The extended strip also presents a better visual reference for other drivers and a psychological deterent against parking too close.

When the vehicle is to be moved and it is desired to retract the guard strips, the operator merely switches the pneumatic system such that the guard strips will return to a retracted and locked position by spring action from the switch actuation which removes the pneumatic pressure.

It is an object of this invention to provide a laterally extendable protective strip for a vehicle to prevent the lateral sides of the vehicle from becoming scratched, dented, or nicked when the vehicle is parked.

In accordance with these and other objects which will be apparent hereinafter, the instant invention will now be described with particular reference to the accompanying drawings.

PREFERRED EMBODIMENT OF THE INVENTION

Figure 1:
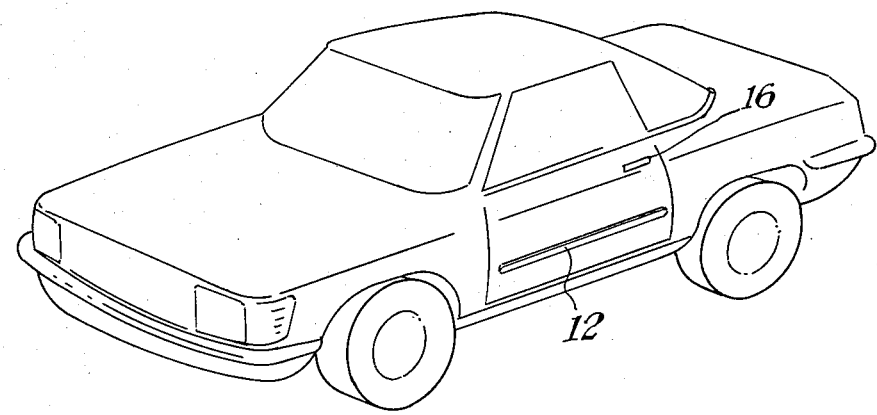
FIG. 1 shows a perspective view of the instant invention mounted on a conventional car door.

Referring now to the drawings and specifically FIG. 1, a conventional vehicle is shown with the present invention including a protective but decorative barrier strip 12 which appears to be firmly affixed on the exterior lateral surface of the vehicle door. In this position the barrier strip presents a low drag profile and is aesthetically pleasing.

Figure 2:
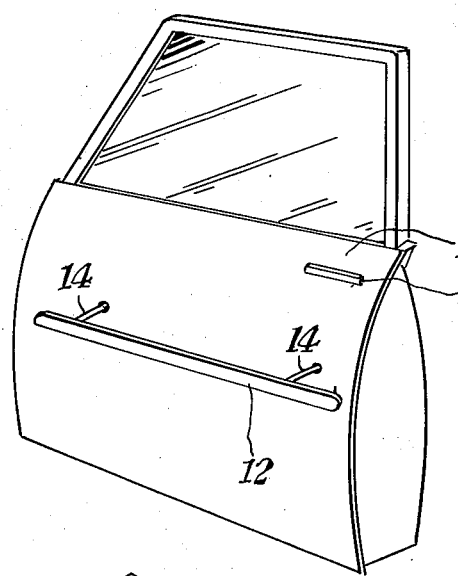
FIG. 2 shows the instant invention in the extended position mounted on a vehicle door.

Referring now to FIG. 2, the protective, decorative strip 12 is shown in an extended position, outwardly away from the exterior surface of the vehicle door 18. The strip 12 is rigidly fixed to a pair of parallel arms 14 which are arcuate in shape and which extend through the outer surface of door 18 and are connected at their opposite ends to a U-shaped frame having vertical bars 22 and a cross-bar 24 integrally connected rigidly fixed to the ends of arms 14. The U-shaped support frame allows for the vehicle window 20 (shown in FIG. 3) to be received into the door frame without interference with the present invention. The vertical parallel arms 22 are sufficiently spaced apart to pass on the sides of the window 20.

Figure 3:
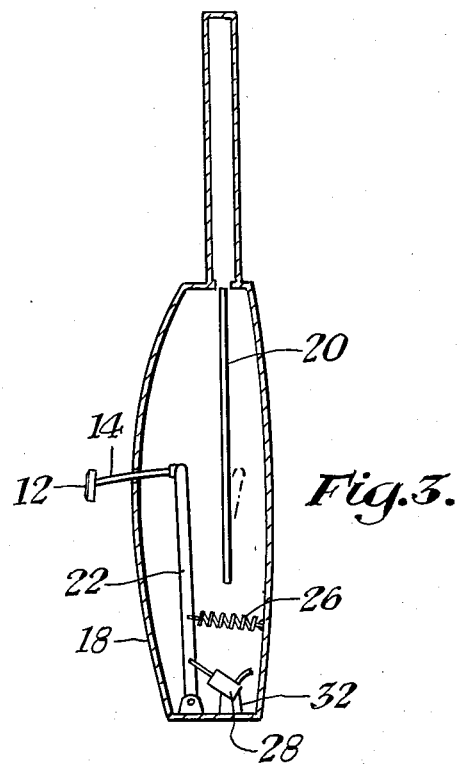
FIG. 3 shows a side elevational view partially in cross-section showing the instant invention.
Figure 4:
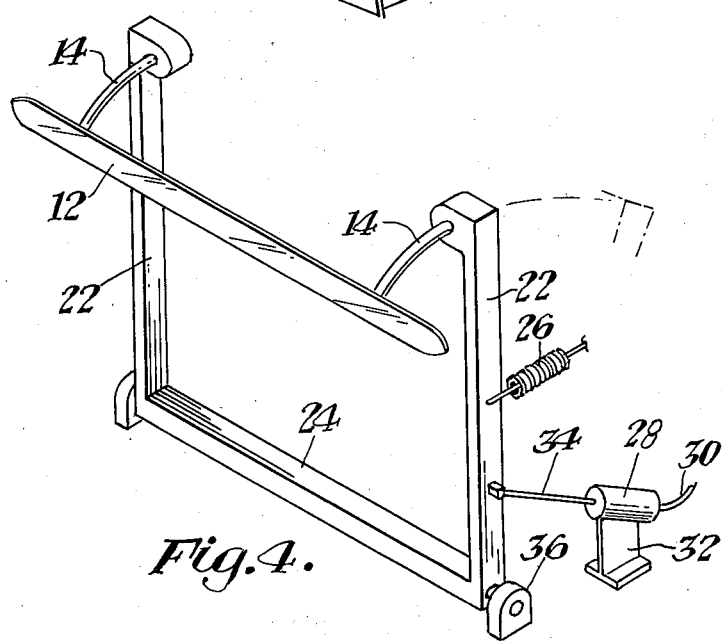
FIG. 4 shows a perspective view of the instant invention.

Referring now to FIGS. 3 and 4, the invention includes a reciprocally moveable, vacuum-actuated piston mounted in housing 28 connected to linkage arm 34 which is pivotally connected relative to one of the vertical bars 22. The piston housing 28 is mounted on a support 32 which may be affixed to the frame of the door. Projecting from the piston housing 28 is a vacuum line 30 which may be connected into the vehicle vacuum system connected to a switch (not shown) preferably located near the driver's position for actuating the vacuum mechanism. The vertical bars 22 and cross-bar 24 are pivotally mounted on the frame of the vehicle door 18 by members 36.

In operation, the invention allows for the movement of the protective but aesthetic strip 12 from a retracted position as shown in FIG. 1 (in which it has the appearance of a conventional protective strip) to a position such as shown in FIGS. 2 and 3 in which the strip is extended outwardly away from the surface of the door to allow for protecting against car doors or other areas of an adjacent vehicle which would otherwise contact the vehicle surface, causing scratches, nicks, or dents in the vehicle's surface. The device is actuated such that when the vacuum is applied to the vacuum housing 28, linkage arm 34 will move outwardly causing the U-shaped arm to rotate outwardly, which extends the protective strip, which will remain in this position until the vacuum is removed from the piston within housing 28. When the driver wishes to move the vehicle, the switch (not shown) is acutated removing the vacuum from the piston, allowing spring 26 to cause the protective strip 12 to again return to the retracted position, as shown in FIG. 1.

Figure 5A:
FIGS. 5a and 5b show an alternate embodiment of the instant invention that is manually operated.
Figure 5B:
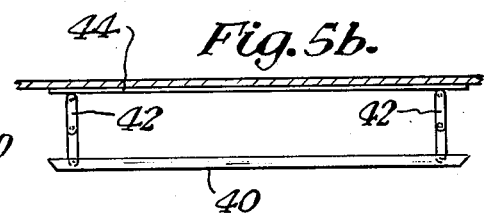

Referring now to FIG. 5, in another embodiment the barrier strip 40 is disposed on a base member 44 which is adhesively (or otherwise) affixed to the car body 38. The guard includes manually extendable arms 42 which are pivotally attached to the base member such that the barrier strip 40 is manually moved from the first retracted position (FIG. 5a) to a second position extended from the body of the vehicle. In this embodiment, mechanical locks or linkage arms may be included to hold the strip 40 away from the vehicle surface 38.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A system for protecting each lateral side of a vehicle to protect doors, fender panels, or the like, the system including a bumper protective strip having the aesthetic appearance of a conventional decorative strip, the system comprising:
    a least one elongated, conventionally appearing guard strip;
    a means for mounting said guard strip in a first position along the external side of a vehicle, said first position having said elongated strip mounted flushly with the external surface of the vehicle, giving the external strip a conventional appearance;
    means for moving said elongated strip from a first flush position against the external surface of a vehicle panel or door to a second extended position substantially away from the external surface of the vehicle; and
    means for retaining said elongated strip in said first position flush against the vehicle lateral external surface or in a second position extended away from said surface.

* * * * *